E. JAHNZ.
CALCULATING MACHINE.
APPLICATION FILED OCT. 27, 1909.

957,062.

Patented May 3, 1910.

3 SHEETS—SHEET 1.

Witnesses:

Inventor
Erwin Jahnz
By
James L. Norris
Atty.

E. JAHNZ.
CALCULATING MACHINE.
APPLICATION FILED OCT. 27, 1909.

957,062.

Patented May 3, 1910.
3 SHEETS—SHEET 2.

Witnesses:

Inventor
Erwin Jahnz
By James L. Norris
Atty.

E. JAHNZ.
CALCULATING MACHINE.
APPLICATION FILED OCT. 27, 1909.

957,062.

Patented May 3, 1910.
3 SHEETS—SHEET 3.

Witnesses:

Inventor
Erwin Jahnz
James L. Norris
Atty

UNITED STATES PATENT OFFICE.

ERWIN JAHNZ, OF BERLIN, GERMANY, ASSIGNOR TO GRIMME, NATALIS & CO. KOMMANDITGESELLSCHAFT AUF AKTIEN, BRAUNSCHWEIG, OF BRUNSWICK, GERMANY, A CORPORATION OF GERMANY.

CALCULATING-MACHINE.

957,062. Specification of Letters Patent. Patented May 3, 1910.

Application filed October 27, 1909. Serial No. 524,819.

*To all whom it may concern:*

Be it known that I, ERWIN JAHNZ, engineer, a subject of the Emperor of Germany, residing at Berlin, Province of Brandenburg, Kingdom of Prussia, Germany, have invented certain new and useful Improvements in Calculating-Machines, of which the following is a specification.

My invention relates to improvements in calculating machines in which calculations are performed by means of setting disks having adjustable teeth or toothed wheels which transmit the values represented by said teeth to a registering or counting mechanism. And more particularly the invention relates to improvements in the arresting mechanism, whereby the counting or registering mechanism is arrested immediately after transmitting a value thereto, so that it can not be thrown, by its impact, beyond the desired position.

The object of the improvements is to provide means in said arresting mechanism, whereby the resistance of the arresting mechanism is reduced, and the noise caused when operating the same is avoided.

With these objects in view my invention consists of the combinations of elements described hereinafter and particularly pointed out in the appended claim.

For the purpose of explaining the invention several examples embodying the same have been illustrated in the accompanying drawings, in which the same numerals of reference have been used in all the views to indicate corresponding parts.

Figure 1:
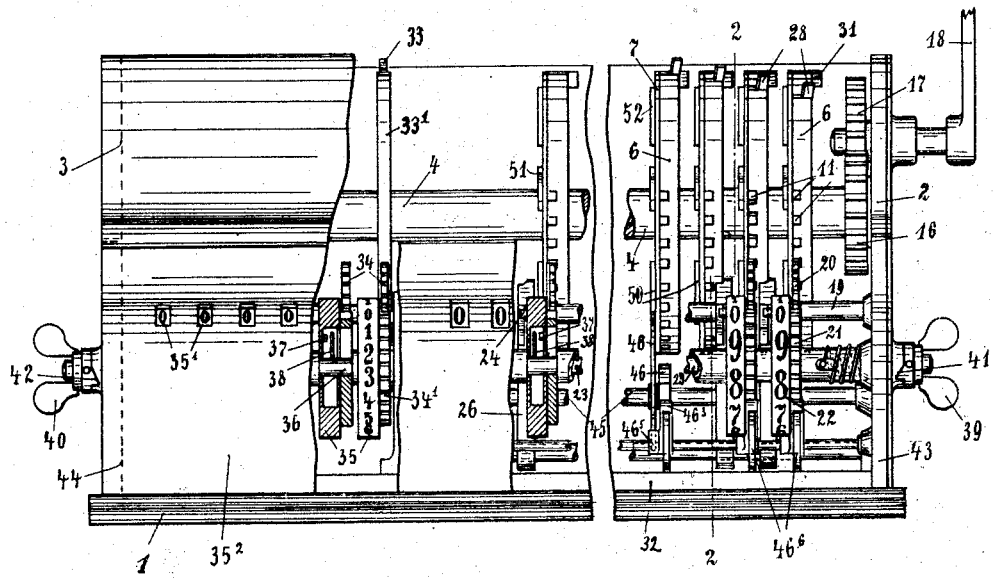
Figure 2:
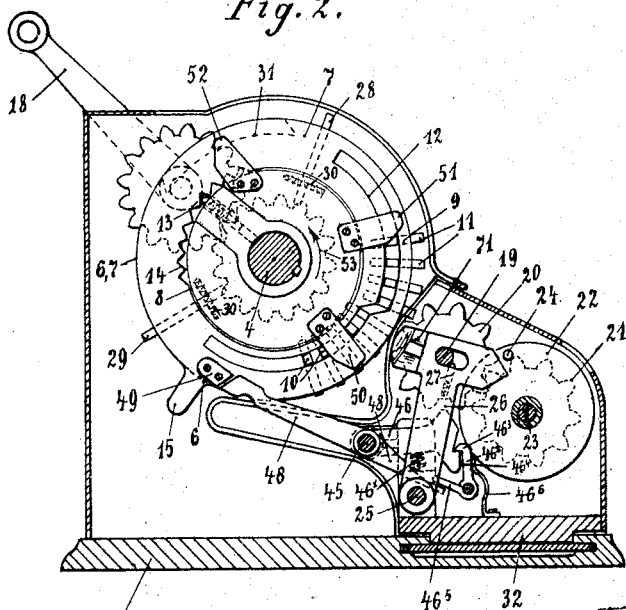
Figure 3:
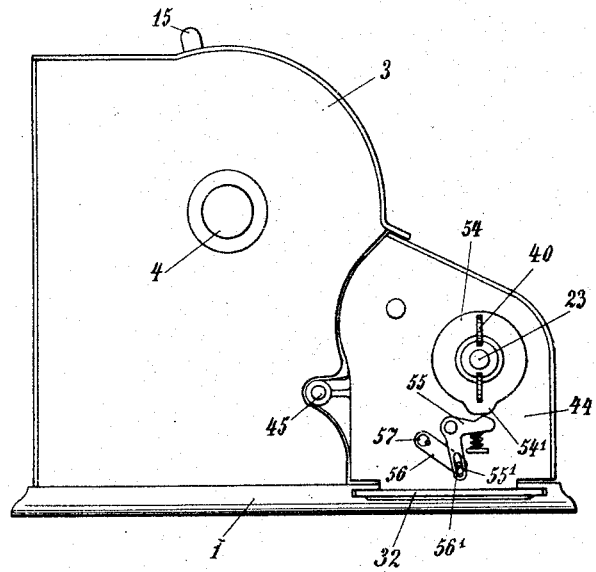
Figure 4:
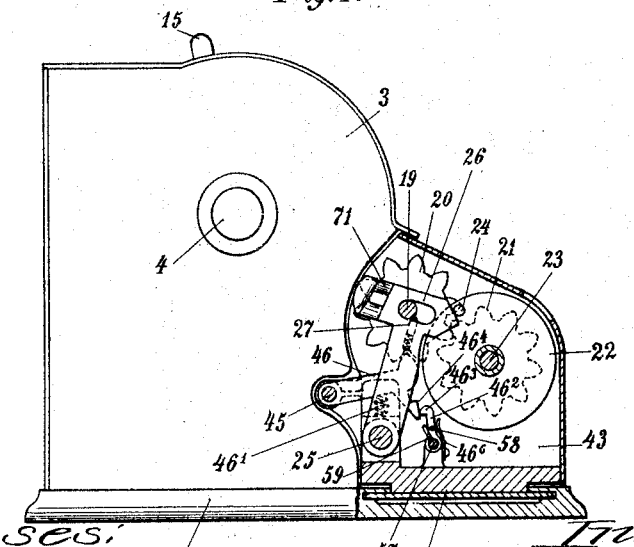
Figure 5:
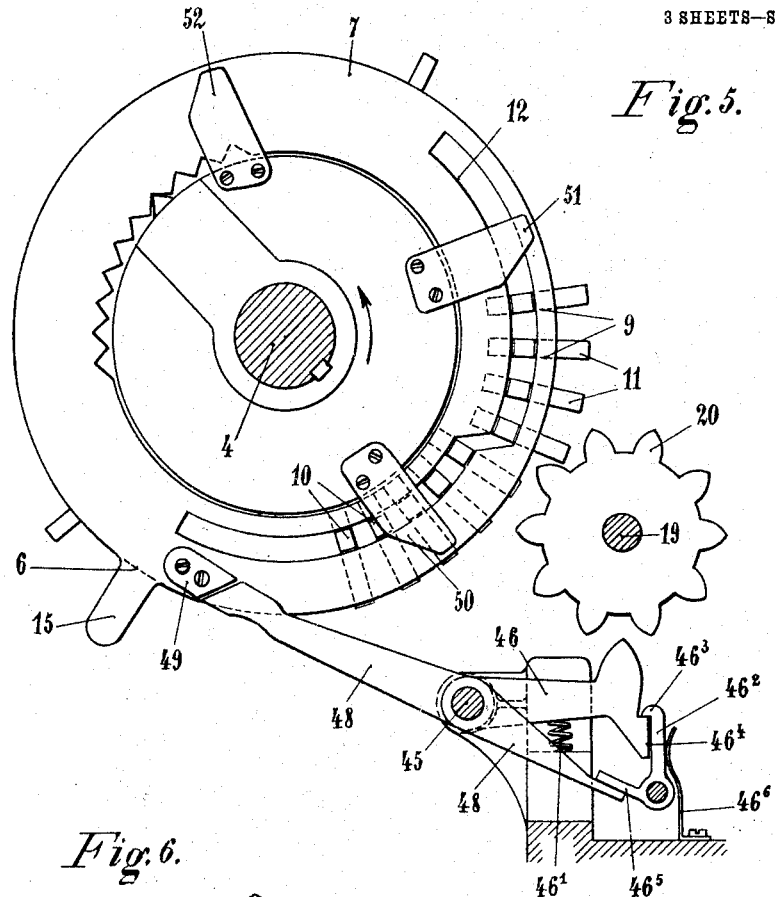
Figure 6:
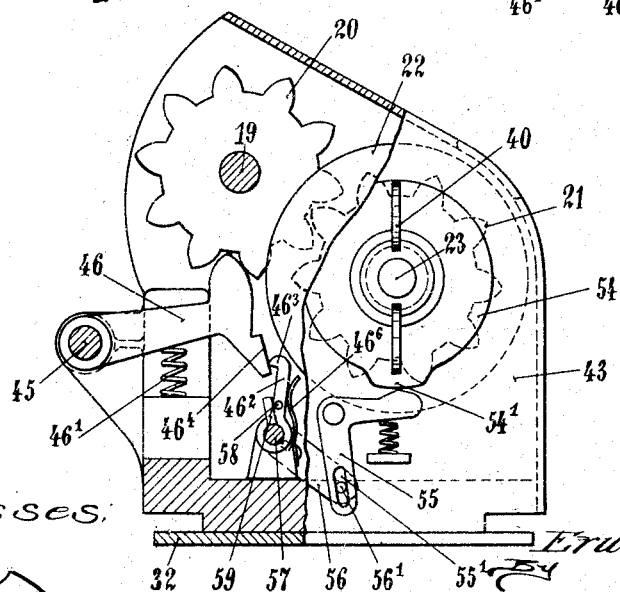

In said drawings—Figure 1, is a front view of a machine embodying the invention, the cover being partly removed, Fig. 2, is a vertical cross-section of Fig. 1 taken on the line 2—2, Fig. 3, is a side view of a machine showing a modification of the invention, adapted for use in combination with the resetting mechanism, and Fig. 4, is a vertical cross-section of the machine shown in Fig. 3. Fig. 5 is an enlarged vertical cross-section of the mechanism as shown by Fig. 1 and taken in the same plane as Fig. 2 and particularly illustrating the features of the improvement. Fig. 6 is a view similar to Fig. 5 showing the features of the improvement as embodied in the modifications illustrated by Figs. 3 and 4.

For the purpose of explaining the invention a machine has been shown in the accompanying drawings the general construction of which is similar to that described in the patent of the United States No. 928,083, granted to me June 17, 1909.

As shown in the drawings, 1 indicates the horizontal base plate of the machine, 2 and 3 indicate the vertical side walls which are attached to and rise from the sides of the said base plate and which afford the support for the shaft 4 of the setting mechanism. The shaft 4 carries a plurality of setting disks 6 which are rigidly secured thereto. Each of the said setting disks is provided with an annular cam disk 7 having a rotary support on a circular concentric shoulder 8 of its disk 6. Each of the setting disks 6 has nine radial grooves 9 which afford a sliding support for small teeth 11 having noses 10. The latter project laterally beyond the face of the setting disk 6 and into a cam groove 12 of the cam disk 7. By turning the cam disk 7 by means of a handle 15 the teeth 11 can be thrown outward beyond the periphery of the setting disk 6. The teeth represent the values to be used in a calculation. To secure the proper adjustment of the said teeth a spring actuated pin 13 is provided for each of the disks 7, which is adapted to engage one of a plurality of notches 14 corresponding to each of the said teeth. The said pin is constructed with a wedge shaped front end, and the notches 14 are shaped accordingly. Thereby the disk 6 can be set only in predetermined positions, in which none of the teeth is but partly projected.

Upon rotation of the setting disk 6 from the machine crank 18 by means of gears 16 and 17 the values set on the setting disks— in the example shown the value 4—are transmitted, through transmission gears 20 mounted on a stationary shaft 19, to gears 21 of the registering mechanism. The said gears 21 are loosely mounted on a shaft 23, and they are rigidly connected with numeral wheels or disks 22 provided at their peripheries with numerical characters from "1" to "9" and the "0" sign.

The tens carrying mechanism consists of a pin 24 secured to the disk 22 which is adapted to rock a lever 26 loosely supported of a shaft 25 and locked in one of its end positions by a spring actuated pin 27.

On each of the setting disks 6 two teeth 28 and 29 are provided which project beyond the periphery of the said disks and are normally forced out of the plane of the teeth 11 by means of springs 30. If the carrying lever 26 is in its rocked position and the setting disk 6 is rotated, the tooth 28 engages the cam face 71 of the lever 26, so that it is rocked into the plane of the adjusted teeth 11 and acts on the adjacent numeral wheel 22 of the next higher order through the transmission gear 20. Each of the numeral disks coöperates with a carrying lever 26 which is adapted to engage the setting disk of the next higher order. Therefore, if a numeral wheel passes from nine to zero, the numeral wheel of the next higher order is advanced into its "1" position, so that the number 10 appears on the registering mechanism.

The tooth 28 is used for the carrying operation in case of additions or multiplications in which the crank 18 is turned to the right, while a tooth 29 comes into operation in case of subtractions and divisions in which the crank is turned to the left. As soon as the carrying tooth 28 or 29 has operated, the lever 26 must be rocked backward into its normal position shown in Fig. 2. To effect this a cam 31 is provided on each of the setting disks 6 between the teeth 28 and 29, which cam rocks the lever 26 into the position shown in Fig. 2 after each operation of the wheel 20 by the carrying teeth 28 and 29.

The invention may also be embodied in a calculating machine in which a mechanism for counting the revolutions of the crank is provided, which mechanism in the example shown is arranged coaxially with the registering mechanism. The said mechanism consists of a single tooth wheel $33^1$ mounted on the shaft 4 of the setting disks and acting on counting wheels 35 loosely mounted on a shaft 36 (Fig. 1). Upon each revolution of the crank of the machine the tooth 33 of the wheel $33^1$ advances a transmission wheel 34 and thereby a gear wheel $34^1$ the distance of two consecutive teeth, whereby the counting wheel 35 connected with said gear wheel $34^1$ is advanced one value. The periphery of each of the counting wheels is provided with numerical characters from "1" to "9" and with a "0" sign, by which the number of the revolutions of the crank is indicated, if the latter is turned either to the right or to the left. The said characters on the counting wheels are displayed through peep holes $35^1$ made in the cover $35^2$ of the casing of the machine.

At the end of a calculating operation the registering and the revolutions counting mechanism 22 and 35 must be set to zero, for which purpose resetting mechanisms of the same construction are provided in each of said mechanisms.

All the numeral disks 22 and counting wheels 35 are made in the form of rings, and within the latter rigid abutments 37 are provided which can be carried along by pins 38 secured to the shafts 23 and 36 respectively. By turning the handles 39 and 40 the shafts are shifted laterally by means of cam faces 41 and 42, and in their shifted positions they can engage the abutments 37. The said abutment is thus carried along when the shafts are shifted laterally. As soon as the mechanisms are brought into their zero positions, the shafts 23 and 36 are shifted backward, so that the pins 38 are disengaged from the abutments 37 of the wheels 22 and 35.

The registering mechanism with the transmission gears 20 and the carrying levers 26, and the revolutions counting mechanism with the intermediate transmission gears 34 are disposed with their vertical side walls 43 and 44 on a separate plate or carriage 32. The said plate 32 is guided within a groove of the base plate 1 and it is slidable therein in a direction parallel to the shaft 4, so that the numeral disks 22 of the carriage 32 can be brought into engagement with any of the setting disks. The purpose of this construction is as follows: If, for example, a number set on the setting disk 6 is to be multiplied by the number 300, for which purpose it must be transmitted three hundred times to the numeral wheel 22, it would be necessary, with the carriage in the position shown in Fig. 1, to rotate the crank three hundred times. If however the carriage is shifted the distance of two values to the right, so that the third numeral wheel 22 is in position to coöperate with the setting mechanism of the first column, only three revolutions of the crank are required in order to multiply the said number by three hundred.

If in performing a calculation the crank of the machine is turned too fast, the gear wheels 20 and 21 and the numeral wheels 22 are sometimes thrown by their impact beyond the desired position, because, as soon as the said wheels arrive in the positions corresponding to the values set on the setting mechanism, their connection with the teeth 11 is broken and the said wheels are free to rotate on their axes. To prevent the wheels from being thrown beyond the desired position locking pawls have been provided for the said wheels which by springs are normally pressed into engagement with the teeth of the gears 20 or 21, or of both gears. The said locking pawls which upon rotation of the gears are forced backward by the gear teeth, and thereupon engage between the following teeth, are objectionable because they increase the resistance of the machine and cause a disagreeable noise. To avoid this pawls 46 of the construction shown in Figs. 1 and 2 have heretofore been used and as disclosed by German Patents Nos. 137,166 and 202,137.

As shown in the said figures, a pawl 46 one for each column, is loosely mounted on a shaft 45, and is normally pressed into engagement with the teeth of the gear wheel 20 by means of a spring $46^1$. In front of each of the pawls 46 a spring actuated detent hook $46^2$ is provided which at the beginning of the rotation of the wheel 20 engages with the pawl 46 forced out of engagement with the teeth of the gear wheel 20, locks the same during the rotation of the said gear wheel, and releases the same at the end of such rotation, whereupon the pawl 46 is again forced into engagement with the teeth of the gear wheel 20 by cam plates 49, 50, 51 or 52 secured to the setting mechanism. In the construction heretofore in use an arm (not shown) is provided, which is connected with the pawl 46 or its shaft 45, and which with its free end is forced into the path of the cam plates 49, 50, 51, and 52, as long as the pawl 46 is out of engagement with the teeth of the transmission gear 20. The function of the said arm is similar to that of the arm 48 described hereafter. However this method of controlling the pawls 46 by means of the detent levers $46^2$ is objectionable, because the said pawl is locked in its inoperative position by friction caused by a spring $46^6$ forcing the detent hook $46^2$ into engagement with the face $46^4$ of the pawl 46. If the cam plates 49, 50, 51, or 52 strike the aforesaid controlling arm rocked into their path, the spring $46^6$, which must be stronger than the spring $46^1$, is overcome, and the pawl 46 is forced by the said arm into engagement with the teeth of the gear wheel 20 against the friction caused by the spring $46^6$.

The object of the improvements is to provide positive means for disengaging the detent lever $46^2$ from the pawl 46, so that the position of the detent hook $46^2$ and the pawl 46 are independent of the strength of a spring. For this purpose the detent hook $46^2$ in thrown out of operation directly by the said cam plates 49, 50, 51, and 52 rotating with the setting mechanism 6, 7. An example of the improved construction is shown in Figs. 1 and 2. As shown in the said figures, a rocking lever 48 is provided, which in the preferred construction is loosely mounted on the shaft 45 carrying the pawl 46. One of the arms of the said lever 48 projects below an arm $46^5$ of the detent hook $46^2$, and with its opposite arm it extends sidewise of the cam disks 7 to a point adjacent to the path of the cam plates 49, 50, 51, and 52. Normally the said arm is not engaged by the said cam plates. If however a transmission gear 20 is rotated by the setting disk 6 coöperating therewith, and the pawl 46 is forced out of engagement with the teeth of the said transmision wheel, the free end of the arm of the lever 48 is rocked by the arm $46^5$ of the detent hook $46^2$ so as to extend into the path of the said cam plates 49, 50, 51, and 52. When rotating the setting mechanism the arm 48 is rocked backward by one of the said cam plates immediately after the transmission wheel 20 has been advanced the predetermined distance. Thereby the detent hook is rocked sufficiently as to release the pawl 46, so that the spring $46^1$ forces the latter into engagement with the teeth of the transmission wheel 20.

The means for releasing the detent hook $46^2$ and the pawl 46 is a positive one, so that the gear 20 can not be thrown, by its impact, beyond the desired position. The cam plate 49 is secured to the cam disk 7. Therefore if the setting disk is rotated in the direction of the arrow 53, the abutment 49 always tends to force the arm 48 downward, as soon as the last one of the teeth 11 has acted on the gear 20. If, however, the setting disk is rotated in the opposite direction, the cam plate 50 which is secured to the setting disk 6 comes into operation as soon as the first one of the teeth 11 has released the gear 20. The cam plates 51 and 52 act on the arm 48 when carrying operations are performed. As such carrying operations are always effected in the same relative position of the parts, the said cams can also be secured to the setting disk 6.

In Figs. 3 and 4 I have illustrated a modification showing, how the invention may be used in combination with a locking device for the gearing actuated by the zero setting mechanism of the registering or revolutions counting mechanism. In this case the release of the detent hook is not effected from the rotating setting mechanism 6, 7 (Figs. 1 and 2) but from the zero setting mechanism. As shown the resetting shaft 23 of the numeral wheels 22 carries a cam disk 54 adapted to control one of the arms of a spring actuated bell crank lever 55. The opposite arm of the latter is connected through a pin $56^1$ and a slot $55^1$ with a crank arm 56 splined to a rock shaft 57. The latter carries all the detent hooks $46^2$ which are loosely mounted thereon. Springs $46^6$ tend to throw the said detent hooks into engagement with the pawl 46. The shaft 57 is provided with radial pins 59 adapted upon rotation of the said shaft to engage pins 58 projecting laterally from the detent hooks $46^2$ and to disengage the latter from the pawls 46. As soon as the shaft 23 of the resetting mechanism is rotated in the usual way by means of the nut 39 (Fig. 1), and the cam $54^1$ of the cam plate 54 releases the bell crank lever 55, the shaft 57 is rocked by the bell crank lever 55 and the crank 56, so as to release the detent hooks $46^2$. Thereby the latter can engage their pawls 46, if the latter are forced out of engagement with the teeth of the transmission wheels 20. Shortly before, or at the end of the operation of the resetting shaft 23 the shaft 57 is again rocked by the cam $54^1$, the bell crank lever 55, and the crank 56, so that all the detent hooks $46^2$ are retracted from their pawls 46, so that at the end of the resetting operation all the pawls 46 are again in engagement with the teeth of the transmission wheels 20. Instead of acting on the bell crank lever 55, the cam disk 54 may also act directly on the crank 56.

I claim:

In a calculating machine, the combination with a rotary value transmitting element, and a rotary value receiving element operatively connected therewith by gear teeth, of a locking device for said receiving element engaging between gear teeth connected with said receiving element and adapted to be thrown out of locking position upon rotation of the receiving element, means to arrest said locking device in non-locking position, and means actuated by said transmitting element to positively throw said arresting means out of operation.

In testimony whereof I have hereunto set my hand in presence of two subscribing witnesses.

ERWIN JAHNZ.

Witnesses:
HENRY HASPER,
WOLDEMAR HAUPT.